United States Patent [19]
Kelly

[11] Patent Number: 5,142,413
[45] Date of Patent: Aug. 25, 1992

[54] OPTICAL PHASE-ONLY SPATIAL FILTER

[76] Inventor: Shawn L. Kelly, 7542-A Amiens La., Centerville, Ohio 45459

[21] Appl. No.: 646,955

[22] Filed: Jan. 28, 1991

[51] Int. Cl.[5] ............................................. G02B 27/46
[52] U.S. Cl. ................................................... 359/559
[58] Field of Search ..................... 350/162.12, 162.13, 350/162.14, 163; 359/559, 560, 561, 577, 566, 569, 572, 576

[56] References Cited

U.S. PATENT DOCUMENTS

| | | | |
|---|---|---|---|
| 3,681,519 | 8/1972 | Larsen et al. | 358/47 |
| 3,756,695 | 9/1973 | Mino et al. | 359/576 |
| 3,768,888 | 10/1973 | Nishino et al. | 359/576 |
| 3,821,795 | 6/1974 | Okano | 358/47 |
| 3,911,479 | 10/1975 | Sakurai | 358/44 |
| 4,786,149 | 11/1988 | Hoenig et al. | 350/356 |
| 4,795,236 | 1/1989 | Ise | 359/569 |
| 4,913,524 | 4/1990 | Kreuzer | 350/162.12 |

*Primary Examiner*—Frank Gonzalez
*Attorney, Agent, or Firm*—Bobby D. Scearce; Donald J. Singer

[57] ABSTRACT

An optical, phase-only spatial filter for filtering spatial frequencies from the output of an optical imaging system is described which comprises an optical element comprised of a pattern of transparent (or reflective, in the case of a mirror) segments, each of which produces an optical path length generally different from that of other segments, and the design of which and the pattern they form dictated by the desired system optical transfer function.

4 Claims, 2 Drawing Sheets

OPTICAL PHASE-ONLY SPATIAL FILTER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to optical filters, and more particularly to an optical, phase-only, spatial filter for filtering spatial frequencies from an output image without substantially reducing the intensity of that output.

Spatial filtering of a spectrum is routinely implemented to decrease error in the corresponding image. Such error is primarily encountered in an image which has been sampled, which results in a harmonic duplication of the original spectrum throughout the spatial frequency domain. Appropriate spatial filtering reduces this error.

Spatial filters for imaging systems currently exist in the form of a mask consisting of one or more apertures which must be very small to be effective and which therefore reduce the image intensity to an unacceptable level for most applications. A second method of applying spatial filtering uses Fourier transform algorithms on a computer to filter the digital image received from a detected array of image values. This second method is slow, does not exhibit real time performance, is expensive and yields a sampled image output limited in definition by the computer, camera and number of pixels on the monitor.

The invention described herein eliminates or substantially reduces in critical importance problems with prior art filters as just described by providing an optical, phase-only spatial filter comprising an optical element that is placed in a nonimage plane of an imaging system, the element consisting of a pattern of segments each producing an optical path length which differs from those produced by other segments as a result of differences in refractive index of the segments and/or in physical path lengths produced by the segments. The size of the segments, the optical path length required to be produced by each and the pattern which they form on the element are determined by the desired filtered optical transfer function for a given imaging system. Maximum filtration results when the optical path length of each segment differs from that of other segments by an amount greater than the coherence length of the light being imaged. Such differences smaller than the coherence length produce correspondingly smaller filtration effects. The invention has application to many areas of optical imaging, especially in reducing sampling effects in projected images.

It is therefore a principal object of the invention to provide an improved optical filter.

It is a further object of the invention to provide a filter for filtering spatial frequencies from an output image without substantially reducing the intensity of that image.

It is another object of the invention to provide an optical filter for reducing error in optically formed images.

These and other objects of the invention will become apparent as a detailed description of representative embodiments proceeds.

SUMMARY OF THE INVENTION

In accordance with the foregoing principles and objects of the invention, an optical, phase-only, spatial filter for filtering spatial frequencies from the output of an optical imaging system is described which comprises an optical element comprised of a pattern of transparent (or reflective, in the case of a mirror) segments, each of which produces an optical path length generally different from that of other segments, and the design of which and the pattern they form dictated by the desired system optical transfer function.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
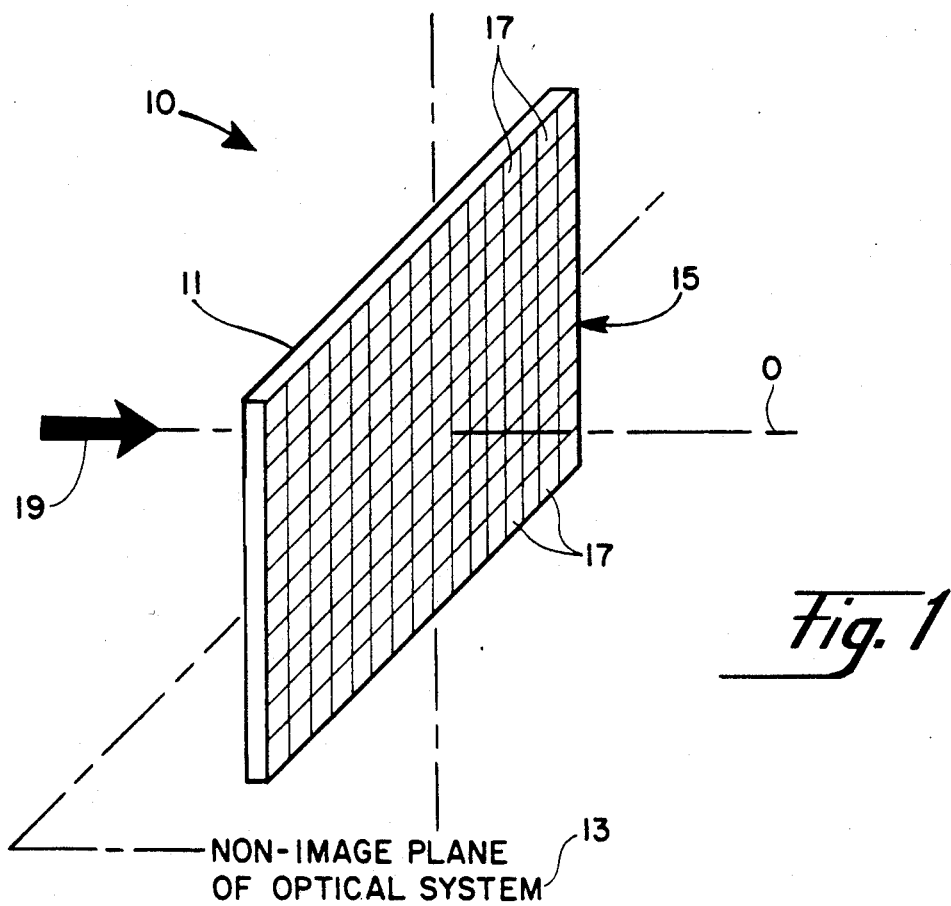
FIG. 1 illustrates schematically a representative form of the invention.

Referring now to the drawings, FIG. 1 shows a representative configuration of a filter 10 of the invention. Filter 10 comprises a substantially transparent window 11 which is placed in a non-image plane 13 of an imaging system (not shown) disposed along an optical axis 0. Filter 10 may be configured as either transmissive or reflective, and comprises an array 15 of substantially discrete segments 17, having any suitable shape such as the rectangular configuration shown in FIG. 1, each such segment having a substantially uniformly constant optical path length therethrough over the surface area thereof. Each segment 17 differs in optical path length from at least one other segment 17 in the array. Maximum filtration results when the optical path length of each segment 17 differs from that of other segments by an amount greater than the coherence length of the input light 19 directed by the imaging system through filter 10. Two or more segments 17 may, however, have substantially identical optical path lengths provided these segments are separated in position within array 15 by distances greater than the largest spatial frequency desired to be filtered. Filter 10 and each segment 17 may comprise any suitable optical material such as glass, plastic or metal (in the case of a reflective filter), as would occur to the skilled artisan guided by these teachings. The difference(s) in optical path lengths between segments 17 may be achieved with various materials or compositions for segments 17 through variations in refractive index and/or segment thickness in the fabrication process for filter 10. The surface area of each segment 17 and the pattern of segments 17 on filter 10 are designed according to the desired filter characteristics for the imaging system in substantially the same manner that a conventional mask filter is designed.

Filter 10 may be fabricated by any suitable process as would occur to the skilled artisan guided by these teachings to produce an array 15 of segments 17 exhibiting the desired optical properties, i.e. optical path length. Accordingly, segments 17 may be deposited and/or fabricated and joined utilizing chemical or ion etching, mechanical ruling, chemical vapor deposition, replication or other suitable method, the same not being considered limiting of the invention. The optical path length of any segment 17 is preferably kept as short as possible in order to minimize the change in the geometric optical characteristics of the imaging system.

Figure 2:
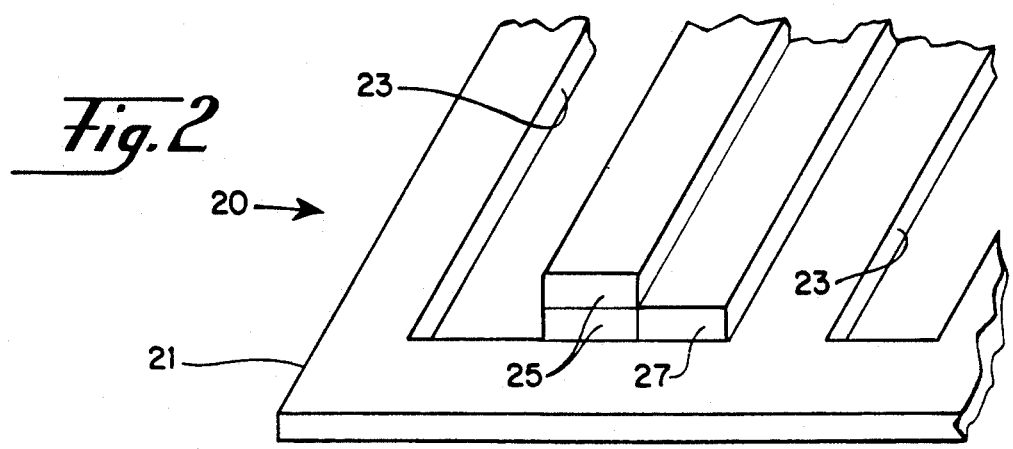
FIG. 2 is a schematic partial view of a filter constructed to demonstrate certain attributes of the invention.
Figure 3:
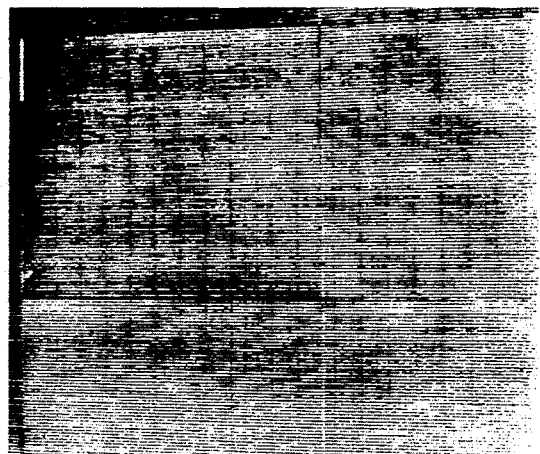
FIG. 3 is the unfiltered image of a slide fabricated for demonstrating certain attributes of the invention.

Referring now to FIG. 2, shown therein is a schematic partial view of a filter 20 constructed for successful demonstration of operability of the invention. Filter 20 comprised a substantially transparent plastic substrate 21 into which were cut a plurality of slits 23 each 0.8 mm wide and regularly separated by 2.4 mm. Two layers 25 of transparent tape and a single layer 27 of transparent tape, each about 0.8 mm in width, were applied to substrate 21 in juxtaposition to each slit 23 as suggested in FIG. 2 to form a repeated pattern on substrate 21 of slits 23 and layers 25,27. Filter 20 was configured for selective one-dimensional filtering of an image of a grid on a slide constructed to demonstrate the filtering function of the invention. Accordingly, the strip width of about 0.8 mm was selected, with a minimum spacing between strips with similar optical path lengths of 1.65 mm. All materials were much thicker than the coherence length of white light. The slide was made with a rectangular grid of dark lines of roughly 450 lines per inch spacing, which defines an array of light squares each 28 microns square and spaced apart 28 microns. A portion of the transmitted unfiltered image of the slide projected through a lens of about 150 mm focal length onto a white screen spaced about 15 feet from the lens is illustrated in FIG. 3.

Figure 4A:
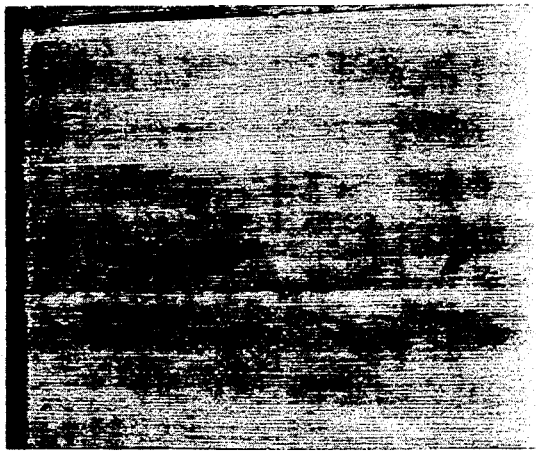
FIGS. 4a and 4b are images of the FIG. 3 slide with the FIG. 2 filter interposed for filtering vertical and horizontal lines, respectively.
Figure 4B:

Referring now to FIGS. 4a and 4b, shown therein are portions of the transmitted images of the grid described above with filter 20 interposed. Comparison of the image of FIG. 3 with those of FIGS. 4a,b show that with slits 23 and layers 25,27 aligned vertically, the fine vertical lines of the FIG. 3 image disappear, and with slits 23 and layers 25,27 aligned horizontally, the fine horizontal lines of the FIG. 3 image disappear.

Operation of the invention may best be explained by considering the image as an interferometric entity. The formation of any spatial frequency in an image depends on the mutual coherence of rays passing through filter 10 which converge at the image with a certain angle associated with that frequency. Since filter 10 is in a non-image plane 13, optical path differences resultant from the structure of filter 10 prohibit coherence between any image forming ray passing through any one segment 17 and those passing through any other, thus prohibiting the associated frequencies from forming. Conversely, those image forming rays which pass through any given segment 17, and those which pass through any two segments 17 of substantially similar optical path length, will maintain mutual coherence and will therefore form the associated spatial frequencies in the image. Since the image forming rays are only modified in phase and not in amplitude, the output contains all the intensity of the input, except for absorption, scattering and reflection losses caused by the materials of construction.

The invention therefore provides an optical, phase-only, spatial filter for filtering spatial frequencies from an image without substantially reducing the intensity of that image. The invention is faster than computer based filtering systems, is less expensive and yields a continuous output. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. An optical filter for filtering spatial frequencies from the output of an optical imaging system, said filter comprising:
    a substantially transparent optical element for placement in a non-image plane of said imaging system, said element comprised of an array of a plurality of transparent segments, each said segment producing an optical path length different from the optical path length of at least one other segment in said array.

2. The optical filter of claim 1 wherein a difference in optical path lengths of said segments is characterized by a corresponding difference in refractive indices of said segments in said array.

3. The optical filter of claim 1 wherein a difference in optical path lengths of said segments is characterized by a corresponding difference in thicknesses of said segments in said array.

4. An optical filter for filtering spatial frequencies from the output of an optical imaging system, said filter comprising:
    a substantially totally reflective optical element for placement in a non-image plane of said imaging system, said element comprised of an array of a plurality of substantially totally reflective segments, each said segment producing an optical path length different from the optical path length of at least one other segment in said array.

* * * * *